J. P. GROSVENOR.
Improvement in Loose Pulleys.
No. 125,388.
2 Sheets--Sheet 1.
Patented April 9, 1872.
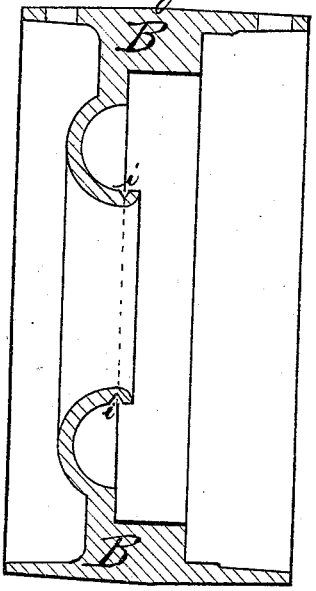
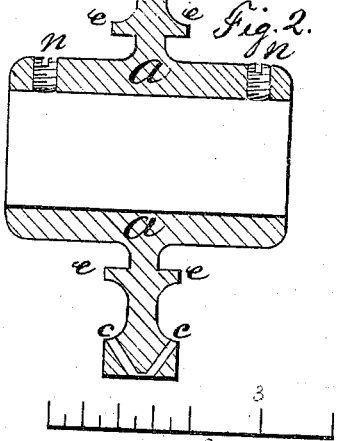
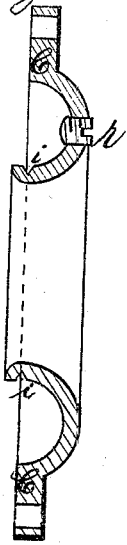
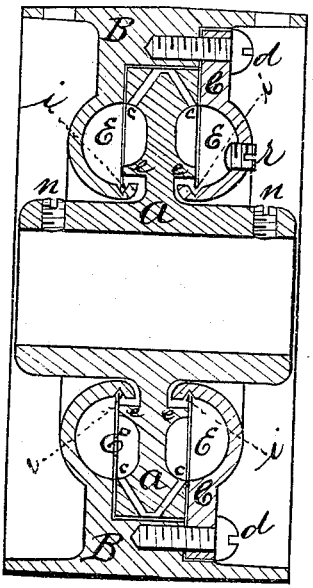
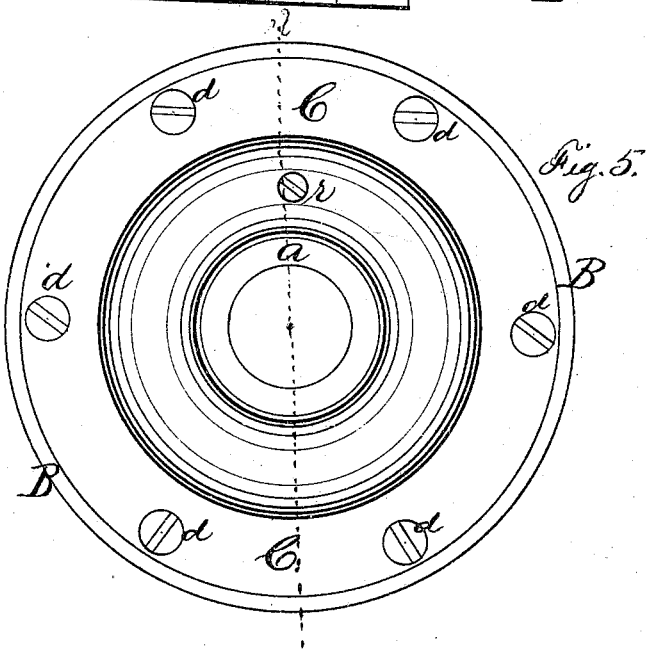
Witnesses.
D. Hall Nice
Erastus Strasug
Inventor.
Jonathan P. Grosvenor 2 Sheets--Sheet 2.
J. P. GROSVENOR.
Improvement in Loose Pulleys.
No. 125,388. Patented April 9, 1872.
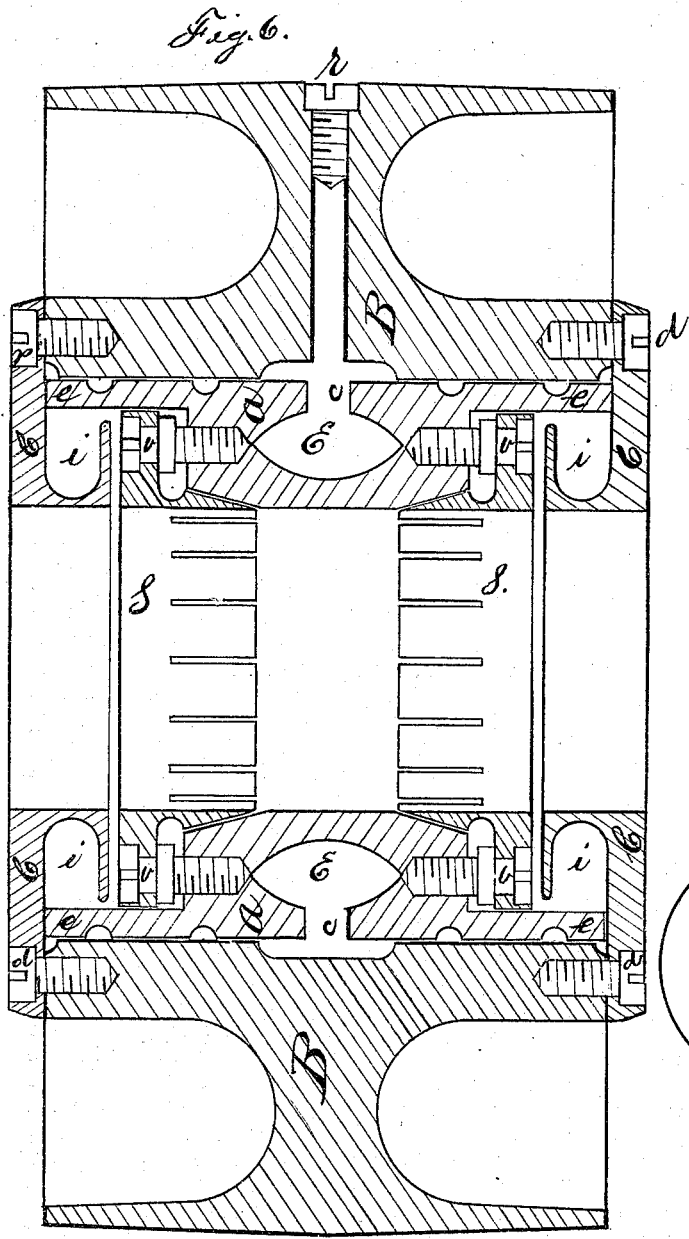
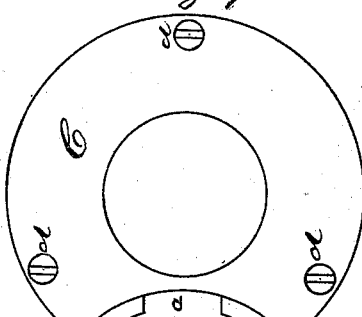
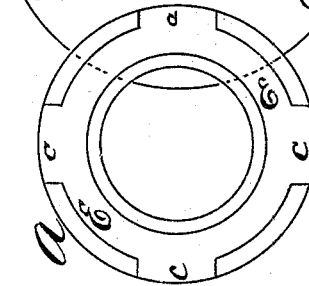
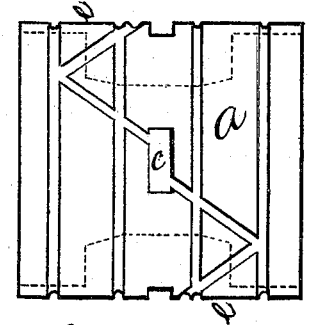
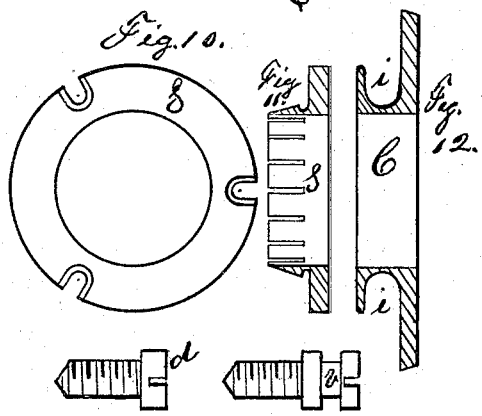
Witnesses.  Inventor.

125,388

UNITED STATES PATENT OFFICE.

JONATHAN P. GROSVENOR, OF LOWELL, MASSACHUSETTS.

IMPROVEMENT IN LOOSE PULLEYS.

Specification forming part of Letters Patent No. 125,388, dated April 9, 1872.

Specification describing a certain Improvement in Loose Pulleys, invented by JONATHAN P. GROSVENOR, of Lowell, in the county of Middlesex and Commonwealth of Massachusetts.

My invention relates to the construction, inside a loose pulley, of a reservoir for oil or other lubricant, so that the oil will not escape from the pulley while stationary, and while revolving is kept within the pulley and constantly applied to all parts of the bearing by the motion of the pulley.

Figure 1 is a sectional view of the pulley when adjusted for operation upon a vertical plane passing through the line of the shaft. Fig. 2 is a sectional view in the same plane of the hub and disk of the pulley, upon which it revolves. Figs. 3 and 4 are sectional views in the same plane of the parts of the pulley disconnected, to permit the hub and disk to be introduced into place. Fig. 5 is an end view of the pulley with the hub and disk secured in place. Figs. 6, 7, 8, 9, 10, 11, and 12 represent a modification of the same device suited to pulleys of small diameter.

A is a hub and disk. The latter is secured to the shaft by set-screws N, holding it and the disk firmly in place. The outer rim of the disk is fitted accurately on its edge and sides to the inner surface of the pulley, and forms the bearing upon which the latter revolves. This rim of the disk is made somewhat thicker than the disk further inward, and the bearing formed on it is grooved across the face, to allow the oil to circulate. Through the rim of the disk passage-ways C C are made, connecting the oil-chamber E with the bearing. At some distance inside its rim, annular projections e e are formed upon each side of the disk concentric with its periphery, overlapping the sides of the pulley, as shown, to assist in preventing the escape of oil from the pulley. B C is the pulley, cast in two parts, as shown, for the purpose of introducing the hub and disk within it. The side C is fitted to the rim of the part B with an oil-tight joint around its edge; and, when the disk and hub are in place, is secured, by screws d d, to the part B. Any suitable packing-material may be used to render the joint around the edge of the part C tight. The interior face of the rim of the pulley is turned out to fit around the rim of the disk and revolve upon it; and further toward its center the sides of the pulley swell outward and then inward again, as shown, so that their central annular edges curve around within the annular projections e e of the disk, and are themselves formed into annular channels i i within the projections on each side of the disk. The channels i i and annular projections e e together serve to prevent any oil from being thrown or escaping outside the pulley, conveying any oil which falls from above around to the lower side of the pulley. E is the oil-chamber, its parts being connected by holes through the disk. r is a screw, removable, for the purpose of introducing oil into the chamber E. To adjust the pulley for use the hub and disk A are placed within the pulley B C and secured as described. The hub is then slipped on a shaft, and secured to it by the set-screws M N. The pulley is turned around until the screw r is in proper position, when the screw is taken out and the oil poured into the oil-chamber. The screw r is then replaced, and the belt run upon the pulley. The rotary motion of the latter will always keep the oil around the interior rim of the pulley upon the bearing of the disk, thus properly lubricating it and preventing the escape of oil from its chamber. Neither can any oil escape from the pulley while it is stationary or being stopped.

Figs. 6, 7, 8, 9, 10, 11, and 12 represent a modification of the pulley shown in Figs. 1 to 6, to adapt its operation to pulleys of small diameter. In this modification the oil-chamber E is placed entirely within the hub and disk A. The pulley B C has both sides removable instead of one, and the sides are flat surfaces upon their exterior. The hub is secured to the shaft by drawing up the circular wedges s s by the screws v v instead of by a set-screw; and the screw r, for introducing oil, is placed upon the face instead of the side of the pulley. The several parts perform the same functions, and are lettered to correspond with those of the pulley first described.

I claim as new and my invention—

1. The pulley B C and hub and disk A combined, to prevent the escape of oil from the pulley, and to lubricate the latter automatically, substantially as described.

2. The oil-chamber E, placed within the periphery of the disk A, upon which the bearing is formed, and connected with the latter by suitable channels for the oil, substantially as described.

3. The bearing of the pulley, formed upon the rim of the disk A, which is of larger diameter than the apertures in the sides of the pulley through which the shaft passes, substantially as described.

4. The combination of the annular projections $e\ e$ and the annular channels $i\ i$, substantially as described.

JONATHAN P. GROSVENOR.

Witnesses:
   D. HALL RICE,
   ERASTUS STEARNS.